US006426568B2

(12) United States Patent
Turnbull et al.

(10) Patent No.: US 6,426,568 B2
(45) **Date of Patent: *Jul. 30, 2002**

(54) LOW RESISTANCE SWITCH USING CARBON CONTACTS

(75) Inventors: Robert R. Turnbull, Holland; G. Bruce Poe, Hamilton; Timothy A. Bonardi, Buchanan, all of MI (US)

(73) Assignee: Gentex Corporation, Zeeland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/439,600

(22) Filed: Nov. 12, 1999

(51) Int. Cl.[7] .................................................. B60L 1/00
(52) U.S. Cl. ...................................... 307/10.1; 359/265
(58) Field of Search ................................ 307/9.1, 10.1; 200/5 R, 512; 359/265, 877, 267; 248/476, 477; 362/494; 323/351

(56) References Cited

U.S. PATENT DOCUMENTS 4,317,012 A * 2/1982 Itoh .......................... 200/5 A
4,575,673 A * 5/1986 Tedeschi et al. ............ 323/351
5,699,044 A * 12/1997 Van Lente et al. .......... 340/525
5,791,459 A * 8/1998 Hester et al. ............... 200/512
5,990,571 A * 11/1999 Sato et al. ................. 307/10.1
6,007,222 A * 12/1999 Thau .......................... 362/494
6,057,956 A * 5/2000 Ash et al. ................... 359/267
6,262,831 B1 * 7/2001 Bauer et al. ................ 359/265

* cited by examiner

*Primary Examiner*—Ronald W. Leja
*Assistant Examiner*—Sharon Polk
(74) *Attorney, Agent, or Firm*—Price, Heneveld, Cooper, DeWitt & Litton

(57) ABSTRACT

A switch assembly includes a plurality of electrical devices and a plurality of user activated switches. The plurality of electrical devices each include a control terminal. Each of the electrical devices causes a different distinguishable output to be provided when a control signal is asserted on the control terminal of one of the plurality of electrical devices. The plurality of user activated switches include carbon-coated contacts. Each of the user activated switches when asserted provides the control signal to the control terminal of one of the plurality of electrical devices.

23 Claims, 3 Drawing Sheets

LOW RESISTANCE SWITCH USING CARBON CONTACTS

BACKGROUND OF THE INVENTION

The present invention relates to switches and more specifically to elastomer switches.

Gold-plated contacts are offered on many mechanical switches. Elastomer or membrane switches have also utilized gold-plated contacts. In a typical elastomer switch used in a high reliability situation, a gold-plated contact attached to an elastomer material is forced into physical contact with a gold-plated contact or contacts on a printed circuit board (PCB). The switch contacts have been plated with gold because gold is a good conductor and generally does not corrode. Gold-plated contacts provide a relatively low resistance path until arcing or wear degrades the gold-plated contacts. However, utilizing gold-plated contacts increases the cost of a switch, as gold is a relatively expensive material and requires additional manufacturing processing steps. As a result, switches with carbon coated contacts have increasingly been utilized as an alternative to switches with gold plated contacts. However, carbon switches suffer from higher and less repeatable contact resistance. On the other hand, while gold contacts are generally adversely affected by the wave soldering process, carbon contacts are generally not adversely affected.

SUMMARY OF THE INVENTION

An embodiment of the present invention is directed to a switch assembly. The switch assembly includes a plurality of electrical devices and a plurality of user activated switches. The plurality of electrical devices each include a control terminal. Each of the plurality of electrical devices causes a different distinguishable output to be provided when a control signal is asserted on its control terminal. The user activated switches include carbon-coated contacts. Each of the user activated switches is associated with one of the plurality of electrical devices. Asserting one of the user activated switches, causes a control signal to be provided to the control terminal of one of the plurality of electrical devices.

In the preferred embodiment, the elastomer switches are incorporated within a rear view mirror. An advantage of the present invention is that gold can be eliminated as a contact material, thus reducing cost without introducing undesirable resistance into a circuit path.

These and other features, advantages and objects of the present invention will be further understood and appreciated by those skilled in the art by reference to the following specification, claims and appended drawings.

DETAILED DESCRIPTION OF THE PRESENT INVENTION

In the preferred embodiment, a plurality of elastomer switches are constructed of an elastomer material and a printed circuit board (PCB). The elastomer material includes a plurality of carbon-coated contacts that are utilized to facilitate electrical contact with carbon-coated contacts located on the PCB. The closure of one of the elastomer switches biases a gate (through a resistor) of an associated field-effect transistor (FET). The associated FET provides a current. The level of the current provided by the FET may be determined by measuring the voltage drop across a load resistor using an external device (e.g., an analog-to-digital (A/D) converter). Alternatively, the FETs can be replaced with bipolar junction transistors (BJTs). Additionally, the switches with carbon-coated contacts could be monitored by a microprocessor. In this configuration, when the microprocessor senses that one of the switches is closed, the microprocessor activates the corresponding FET or a BJT (or performs an appropriate routine based upon which switch is closed).

An advantage of this technique is that gold can be eliminated as a contact material, thus reducing cost without introducing undesirable resistance into a circuit path. While switches with carbon-coated contacts may not be as reliable as switches with gold-plated contacts (i.e., the resistance of the carbon-coated contact may not be as low or repeatable), the variation in contact resistance does not affect the output path. This is because the switches with carbon-coated contacts are only used to activate a FET or BJT (or provide an input to a microprocessor). Thus, the implementation of switches with carbon-coated contacts in conjunction with an electrical switch (FET or BJT) provides a product with a lower overall cost for applications that can utilize switches of this nature.

Figure 1:
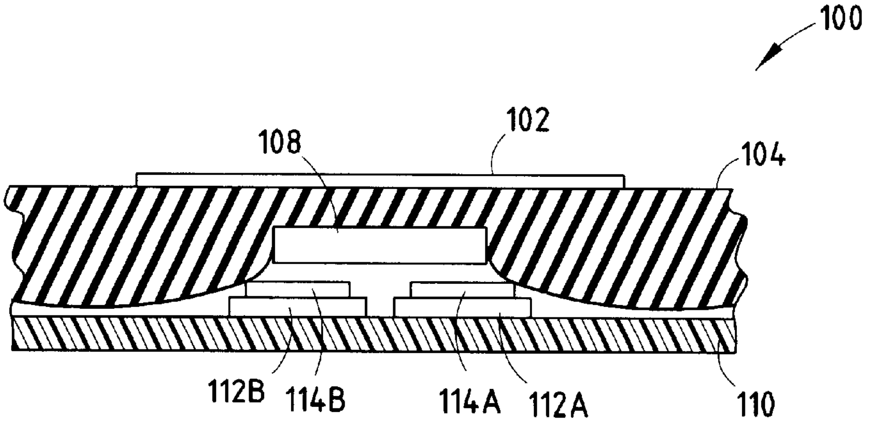
FIG. 1 is a cross-sectional view of an elastomer switch, according to an embodiment of the present invention.

FIG. 1 shows an elastomer switch 100. Elastomer switch 100 includes a button cap 102, an elastomer 104, a carbon-coated contact 108, a printed circuit board (PCB) 110, copper traces 112A and 112B and carbon-coated contacts 114A and 114B. As depicted in FIG. 1, button cap 102 is attached to elastomer 104. Also, attached to elastomer 104 is carbon contact 108. Copper traces 112A and 112B are attached to PCB 110. Copper traces 112A and 112B are coated with carbon in the contact area to form carbon contacts 114A and 114B. The application of carbon to copper is well known to those of ordinary skill in the art and serves to provide a non-corrosive contact.

Elastomer 104 serves to keep carbon contact 108 from making contact with carbon contacts 114A and 114B when a user is not applying a sufficient force to button cap 102. When the user applies a sufficient force to button cap 102, carbon contact 108 comes in contact with carbon contacts 114A and 114B. In the disclosed embodiment, either carbon contact 114A or 114B is coupled to a common ground (through trace 112A or 112B). The carbon contact 114A or 114B that is not coupled to the common ground is coupled to a resistor 212, 214 or 216 (through trace 112B or 112A, see FIG. 2). With carbon contact 108 bridging the gap between carbon contacts 114A and 114B, an A/D converter (not shown) can measure a voltage (across a load resistor 252) at output node 250.

Figure 2:
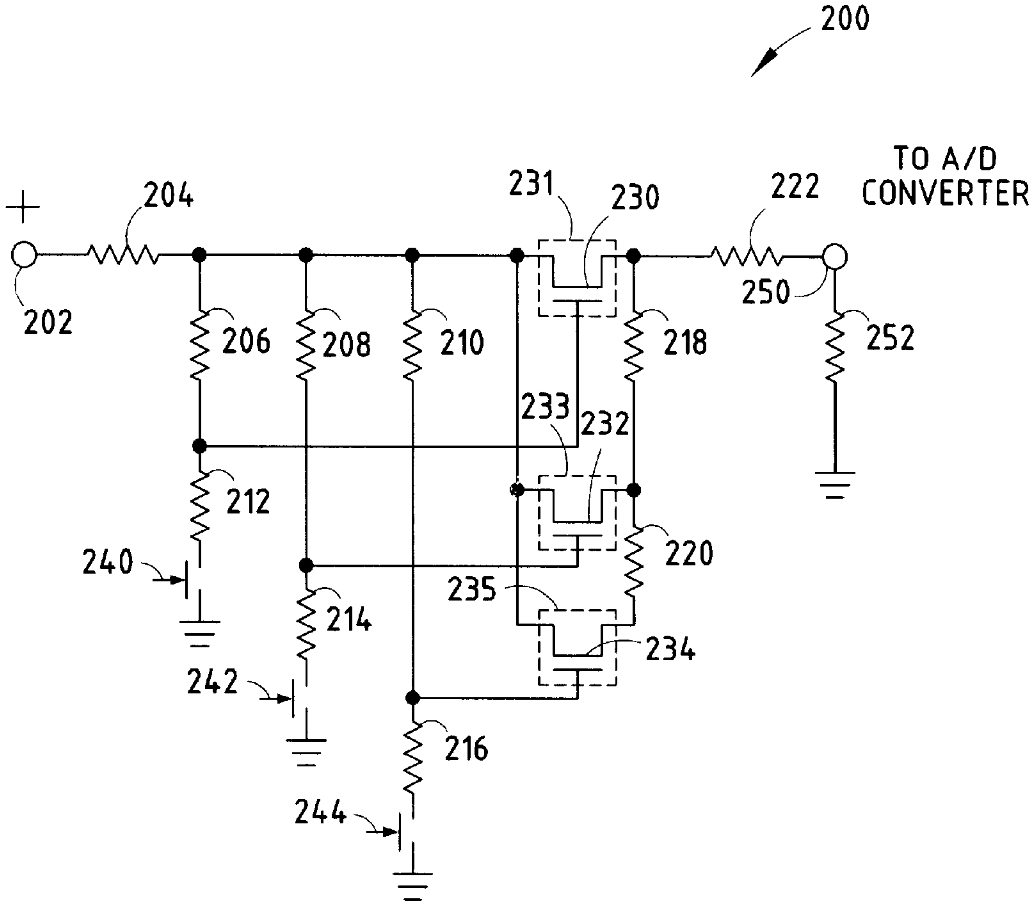
FIG. 2 is an electrical schematic incorporating the switch of FIG. 1, according to an embodiment of the present invention.

FIG. 2 depicts an elastomer switch assembly 200 that includes three elastomer switches 240, 242 and 244 which are constructed according to FIG. 1. While only three switches are shown, one skilled in the art will appreciate that additional (or fewer) switches can be incorporated in an electrical circuit such as depicted in FIG. 2. The voltage (across load resistor 252) read at output node 250, by an A/D converter (or other device), provides an indication of which switch is closed (providing a proper value load resistor is selected in relation to resistors 204, 218, 220 and 222). The current or voltage at output node 250 is set by resistors 204, 220, 218 and 222 and load resistor 252. Resistors 206, 208 and 210 pull-up (to voltage supply 202) the gates of FETs 230, 232 and 234 when one of three switches 240, 242 or 244 are not closed. Preferably, resistors 206, 208 and 210 are 10k resistors. When the gates of FETs 230, 232 and 234 are pulled to voltage supply 202, FETs 230, 232 and 234 are off. FETs 230, 232 and 234, as disclosed, are P-channel MOSFETs. One of skill in the art will appreciate that the disclosed circuit could be modified to utilize other electrical devices 231, 233 and 235, e.g., N-channel MOSFETs, PNP or NPN bipolar transistors, P or N-channel JFETs or other amplifying devices.

When switch 240 is actuated, FET 230 is turned on. When switch 242 is actuated, FET 232 is turned on. When switch 244 is actuated, FET 234 is turned on. One of skill in the art will appreciate that the disclosed embodiment of the present invention can only decode one of switches 240, 242 or 244 at any given time. Resistors 212, 214 and 216 are chosen such that when the corresponding switches 240, 242 and 244 close, the corresponding FET is turned on (i.e., $|V_{GS}|>|V_{TH}|$). Preferably, resistors 212, 214 and 216 are 4.7 kΩ resistors. Resistors 204, 218, 220 and 222 are selected such that the A/D converter (or other device) can determine which of switches 240, 242 or 244 have been actuated. Preferably, resistors 204, 218, 220 and 222 are 200Ω, 1.5 k Ω, 10 k Ω and 1.3 k Ω resistors, respectively. If desired, current limiting resistors can be installed serially with the gates of FETs 230, 232 and 234. In addition, it may be desirable to install 0.1 μF, 50V, filter capacitors (not shown) at supply 202 and output node 250.

Figure 3:
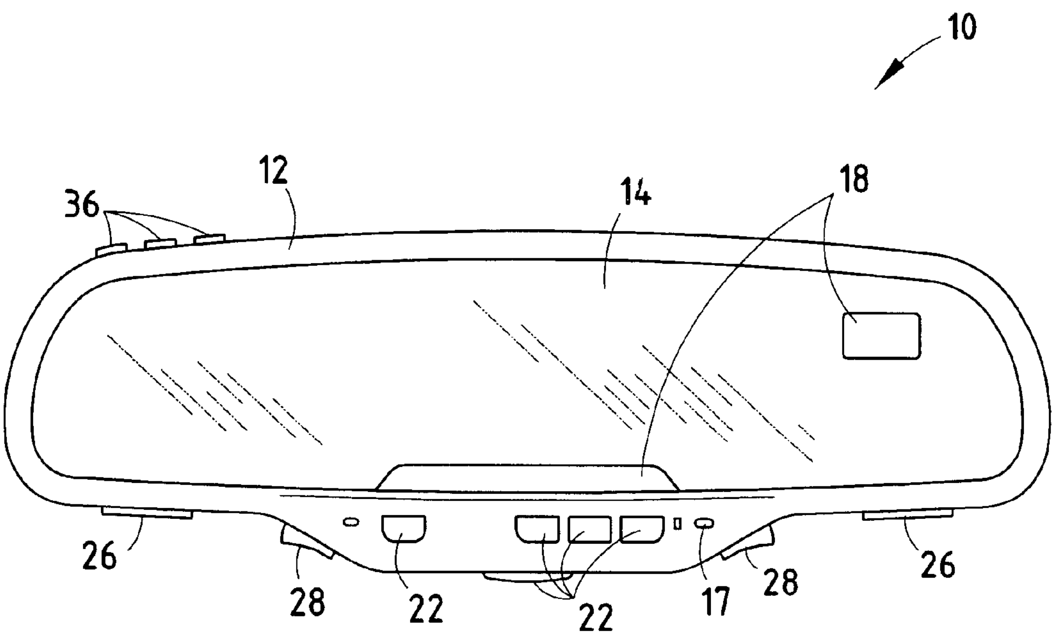
FIG. 3 is a front perspective view of a rearview mirror assembly in which the switch assembly shown in FIG. 2 may be implemented.
Figure 4:
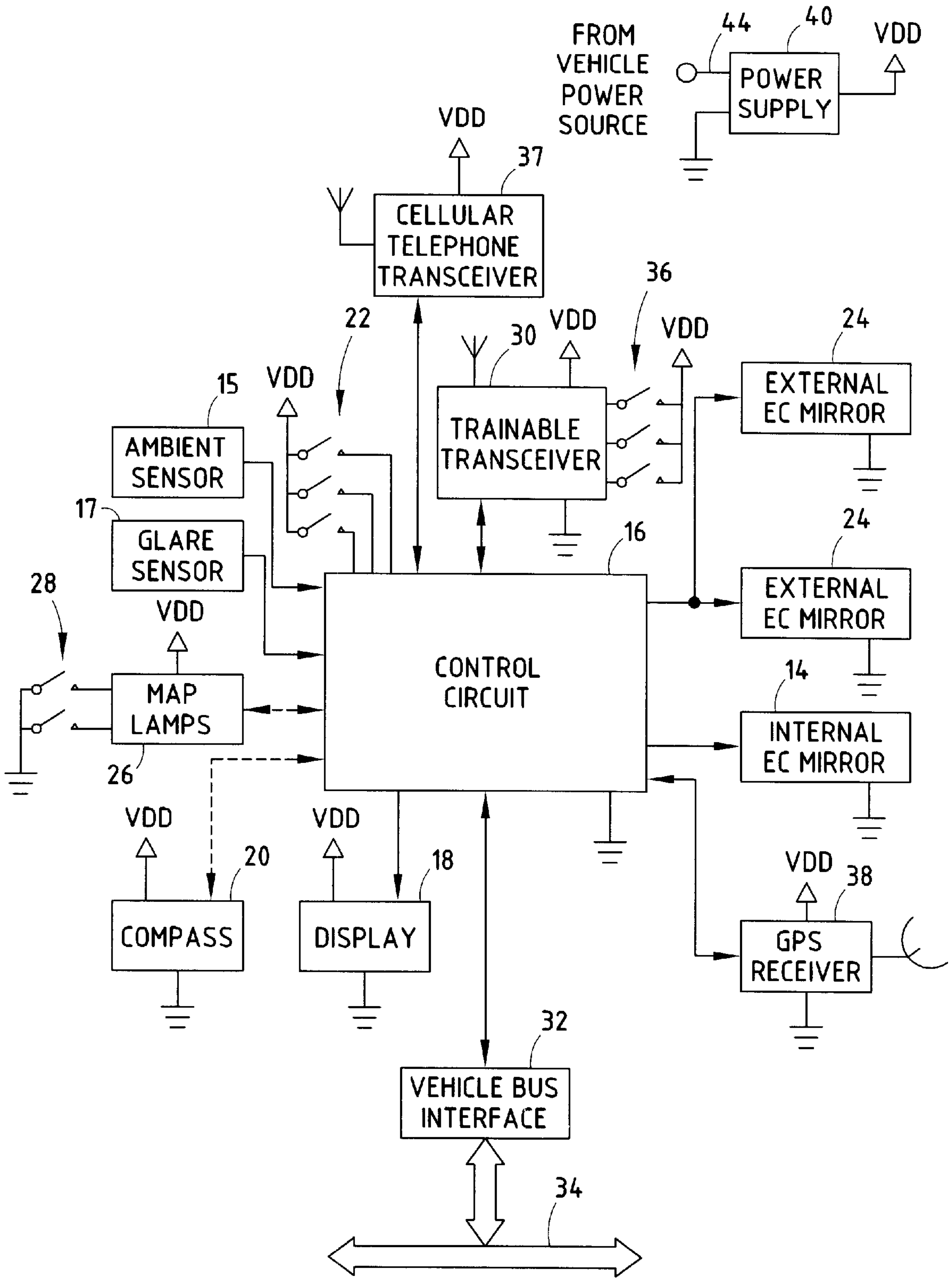
FIG. 4 is an electrical circuit diagram in block and schematic form illustrating an electrical circuit that may be implemented in the rearview mirror assembly shown in FIG. 3.

FIG. 3 shows a rearview mirror assembly 10 in which the disclosed switch assembly may be utilized. As illustrated, rearview mirror assembly 10 includes a housing (including a bezel) 12. Mirror assembly 10 further includes a mirror element 14, which is preferably an electrochromic mirror element having a reflectivity that is automatically and electronically controlled by a control circuit that responds to light levels sensed by an ambient light sensor 15 and a glare sensor 17 (FIG. 4). As illustrated in FIG. 4, a control circuit 16 is provided within mirror assembly 10 to process outputs from sensors 15 and 17 and to adjust a voltage level between 0 and 1.2V, for example, that is applied to the internal electrochromic mirror element 14. If the vehicle is equipped with external electrochromic mirrors 24, control circuit 16 may also apply a selected voltage level on a line coupled to external electrochromic mirrors 24. A preferred construction by which control circuit 16 may be electrically coupled to external electrochromic mirrors 24 is disclosed in commonly assigned U.S. patent application Ser. No. 09/368,325 (now U.S. Pat. No. 6,229,434, which issued on May 8, 2001), entitled VEHICLE COMMUNICATION SYSTEM, filed by Robert C. Knapp et al. on Aug. 3, 1999, the disclosure of which is incorporated herein by reference.

Referring to FIGS. 3 and 4, mirror assembly 10 may also include one or more displays 18 that are mounted behind mirror element 14 so as to display information to the vehicle occupants. Such displays are typically mounted behind certain regions of the mirror element where the reflective material of the mirror element has been removed to provide a transparent non-reflective window. Preferably, however, if displays are utilized in the rearview mirror assembly, mirror element 14 is constructed with a transflective layer as disclosed in commonly assigned U.S. patent application Ser. No. 09/311,955 (now U.S. Pat. No. 6,356,376, which issued on Mar. 12, 2002), entitled ELECTROCHROMIC REARVIEW MIRROR INCORPORATING A THIRD SURFACE METAL REFLECTOR AND A DISPLAY/SIGNAL LIGHT, filed by William L. Tonar et al. on May 14, 1999, the disclosure of which is incorporated herein by reference.

Display(s) 18 may be used to display information, such as external temperature and/or vehicle heading, as determined by an electronic compass 20 that may also be mounted inside housing 12. The display(s) 18 may also be used to display various other information, such as instruction codes for a trainable transceiver 30, time of day, the text from a paging signal, tire pressure, telephone numbers or any other information that would commonly be conveyed to the vehicle occupants, such as the information conveyed by a vehicle trip computer. Display 18 may be configured as a dual display as disclosed in commonly assigned U.S. patent application Ser. No. 09/359,616 (now U.S. Pat. No. 6,346,698, which issued on Feb. 12, 2002), entitled LOW EMI MULTIPLEXED DUAL DISPLAY, filed by Robert R. Turnbull on Jul. 22, 1999, the disclosure of which is incorporated herein by reference.

Rearview mirror assembly 10 may further include a plurality of user-activated switches 22 that enable a vehicle occupant to input commands to control circuit 16 that may be used to control the information that is displayed on display(s) 18, to turn on or off the electrochromic mirror, or to control any other electronic device or component that is disposed within housing 12 or otherwise electrically coupled to control circuit 16.

As shown in FIGS. 3 and 4, mirror assembly 10 may also include map lamps 26 disposed on a bottom surface of housing 12 along with associated switches 28 that allow a vehicle occupant to selectively turn map lamps 26 on and off. Map lamps 26 may also be turned on and off via control circuit 16 when, for example, the vehicle doors are opened or an interior light switch on the instrument panel is activated. Control circuit 16 may receive information that doors have been opened or that an interior light switch has been activated via a vehicle bus interface 32 that is coupled to an electrical bus system of the vehicle. Map lamps 26 are preferably constructed using light-emitting diodes (LEDs) as disclosed in commonly assigned U.S. Pat. No. 5,803,579, entitled ILLUMINATOR ASSEMBLY INCORPORATING LIGHT EMITTING DIODES, filed by Robert R. Turnbull et al. on Jun. 13, 1996, the disclosure of which is incorporated herein by reference.

If a trainable transceiver 30 is disposed within housing 12 or otherwise electrically coupled to control circuit 16, mirror assembly 10 may also include a plurality of additional user-activated switches 36 that may be manipulated to selectively transmit an associated RF signal to a garage door opener receiver or to an electronic control system remote from the vehicle. Trainable transceiver 30 may also be utilized to receive remote keyless entry (RKE) signals, in which case trainable transceiver 30 may apply RKE detection signals to an input of control circuit 16, whereby control circuit 16 would convey one or more signals through bus interface 32 over vehicle bus 34 to which the door locks would respond by locking or unlocking and to which an alarm system may respond by becoming activated or deactivated. Also, lights within the vehicle, such as map lamps 26, may additionally respond to this signal so as to turn on or off the lights within or outside of the vehicle.

As also shown in FIG. 4, a GPS receiver 38 may be mounted in rearview mirror housing 12 and coupled to control circuit 16. The information obtained from GPS receiver 38 may be utilized in a variety of manners as disclosed in commonly assigned U.S. patent application Ser.

No. 09/250,086 (now U.S. Pat. No. 6,166,698, which issued on Dec. 26, 2000), entitled REARVIEW MIRROR WITH INTEGRATED MICROWAVE RECEIVER, filed by Robert R. Turnbull et al. on Feb. 16, 1999, the disclosure of which is incorporated herein by reference.

A cellular telephone transceiver 37 may also be provided in housing 12 or otherwise coupled to control circuit 16. Cellular transceiver 37 may form part of a vehicle communication system, such as the On-Star® system now available on many General Motors vehicles. Cellular telephone transceiver 37 may receive user input commands via switches 22. or from additional switches that are provided on housing 12 or remote from housing 12.

To convert the power supplied from a conventional 12V vehicle power source 44, a power supply circuit 40 is provided that converts the 12V power to 5V or less for use by the above-noted electrical components.

In the rearview mirror assembly described above, any one or more of switches 22, 28 or 36 can be constructed as described above with respect to FIGS. 1 and 2. Where more than one such membrane switch is coupled to a single input terminal of a microprocessor or control circuit, the circuitry shown in FIG. 2 may be used to supply signals that are distinguishable from one another so that the microprocessor or control circuit may determine which of the membrane switches has been actuated.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed:

1. A switch assembly, comprising:

a first electrical device including a first control terminal, the first electrical device causing a distinguishable electrical output to be provided on a single output line when a first control signal is asserted on the first control terminal of the first electrical device;

a second electrical device including a second control terminal, the second electrical device causing a different distinguishable electrical output to be provided on the single output line when a second control signal is asserted on the second control terminal of the second electrical device;

a first user activated switch with carbon-coated contacts, the first user activated switch when asserted providing the first control signal to the first control terminal of the first electrical device; and a second user activated switch with carbon-coated contacts, the second user activated switch when asserted providing the second control signal to the second control terminal of the second electrical device.

2. The switch assembly of claim 1, wherein the user activated switches each include:

an elastomer;

a carbon coated contact attached to the elastomer at a contact area; and a first copper trace and a second copper trace attached to a printed circuit board, wherein the first and second copper traces each include carbon-coated contacts at the contact area, and wherein the elastomer prevents the carbon-coated contact attached to the elastomer from making electrical contact with the carbon-coated contacts of the first and second copper traces when the user activated switches are unactivated.

3. The switch assembly of claim 1, wherein the electrical devices are field effect transistors.

4. The switch assembly of claim 1, wherein the electrical devices are bipolar junction transistors.

5. A rearview mirror assembly for a vehicle comprising:

a housing having a mounting member for mounting said housing to the vehicle, said housing including a bezel;

an electrochromic mirror disposed in said housing, said mirror having a front surface and a rear surface; and a switch assembly retained in said housing including:

a plurality of electrical devices each further including a control terminal, each of the plurality of electrical devices causing a different distinguishable electrical output to be provided to a remote electrical device on a single output line when a control signal is asserted on the control terminal of one of the plurality of electrical devices; and a plurality of user activated switches with carbon-coated contacts, each of the user activated switches when asserted providing the control signal to the control terminal of one of the plurality of electrical devices.

6. The rearview mirror assembly of claim 5, wherein said electrochromic mirror comprises:

front and rear spaced elements, each having front and rear surfaces and being sealably bonded together in a spaced-apart relationship to define a chamber;

a transparent first electrode including a layer of transparent conductive material carried on said rear surface of said front element;

at least one electrochromic material contained within said chamber; and a second electrode disposed on said front surface of said rear element, wherein either said second electrode is a reflective electrode or a transparent electrode with a corresponding separate reflector disposed over substantially all of said rear surface of said rear element.

7. The rearview mirror assembly of claim 5, wherein the user activated switches of the switch assembly each further include:

an elastomer;

a carbon coated contact attached to the elastomer at a contact area; and a first copper trace and a second copper trace attached to a printed circuit board, wherein the first and second copper traces each include carbon-coated contacts at the contact area, and wherein the elastomer prevents the carbon-coated contact attached to the elastomer from making electrical contact with the carbon-coated contacts of the first and second copper traces when the user activated switches are unactivated.

8. The rearview mirror assembly of claim 5, wherein the electrical devices are field effect transistors.

9. The rearview mirror assembly of claim 5, wherein the electrical devices are bipolar junction transistors.

10. The rearview mirror assembly of claim 5, wherein a processor monitors the plurality of user activated switches and provides the control signal to one of the plurality of electrical devices upon switch assertion.

11. The rearview mirror assembly of claim 5, wherein the plurality of electrical devices includes a first electrical device that causes a distinguishable electrical output to be provided on the single output line when a first control signal is asserted on a first control terminal of the first electrical device and a second electrical device that causes a different distinguishable electrical output to be provided on the single output line when a second control signal is asserted on a second control terminal of the second electrical device, and wherein the plurality of user activated switches includes a first user activated switch with carbon-coated contacts which when asserted provides the first control signal to the first control terminal of the first electrical device and a second user activated switch with carbon-coated contacts which when asserted provides the second control signal to the second control terminal of the second electrical device.

12. A rearview mirror assembly for a vehicle comprising:

a housing having a mounting member for mounting said housing to the vehicle, said housing including a bezel;

an electrochromic mirror disposed in said housing, said mirror having a front surface and a rear surface; and a switch assembly retained in said housing including:

a plurality of electrical devices each further including a control terminal, each of the plurality of electrical devices causing a different distinguishable electrical output to be provided to a cellular telephone transceiver on a single output line when a control signal is asserted on the control terminal of one of the plurality of electrical devices; and a plurality of user activated switches with carbon-coated contacts, each of the user activated switches when asserted providing the control signal to the control terminal of one of the plurality of electrical devices.

13. The rearview mirror assembly of claim 12, wherein said electrochromic mirror comprises:

front and rear spaced elements, each having front and rear surfaces and being sealably bonded together in a spaced-apart relationship to define a chamber;

a transparent first electrode including a layer of transparent conductive material carried on said rear surface of said front element;

at least one electrochromic material contained within said chamber: and a second electrode disposed on said front surface of said rear element, wherein either said second electrode is a reflective electrode or a transparent electrode with a corresponding separate reflector disposed over substantially all of said rear surface of said rear element.

14. The rearview mirror assembly of claim 12, wherein the user activated switches of the switch assembly each further include:

an elastomer;

a carbon coated contact attached to the elastomer at a contact area; and a first copper trace and a second copper trace attached to a printed circuit board, wherein the first and second copper traces each include carbon-coated contacts at the contact area, and wherein the elastomer prevents the carbon-coated contact attached to the elastomer from making electrical contact with the carbon-coated contacts of the first and second copper traces when the user activated switches are unactivated.

15. The rearview mirror assembly of claim 12, wherein the electrical devices are field effect transistors.

16. The rearview mirror assembly of claim 12, wherein the electrical devices are bipolar junction transistors.

17. The rearview mirror assembly of claim 12, wherein a processor monitors the plurality of user activated switches and provides the control signal to one of the plurality of electrical devices upon switch assertion.

18. The rearview mirror assembly of claim 12, wherein the plurality of electrical devices includes a first electrical device that causes a distinguishable electrical output to be provided on the single output line when a first control signal is asserted on a first control terminal of the first electrical device and a second electrical device that causes a different distinguishable electrical output to be provided on the single output line when a second control signal is asserted on a second control terminal of the second electrical device, and wherein the plurality of user activated switches includes a first user activated switch with carbon-coated contacts which when asserted provides the first control signal to the first control terminal of the first electrical device and a second user activated switch with carbon-coated contacts which when asserted provides the second control signal to the second control terminal of the second electrical device.

19. A vehicle accessory for a vehicle, comprising:

a housing having a mounting member for mounting said housing to the vehicle; and a switch assembly retained in said housing including:

a plurality of electrical devices each further including a control terminal, each of the plurality of electrical devices causing a different distinguishable electrical output to be provided to a cellular telephone transceiver on a single output line when a control signal is asserted on the control terminal of one of the plurality of electrical devices; and a plurality of user activated switches with carbon-coated contacts, each of the user activated switches when asserted providing the control signal to the control terminal of one of the plurality of electrical devices.

20. The accessory of claim 19, wherein the user activated switches of the switch assembly each further include:

an elastomer;

a carbon coated contact attached to the elastomer at a contact area; and a first copper trace and a second copper trace attached to a printed circuit board, wherein the first and second copper traces each include carbon-coated contacts at the contact area, and wherein the elastomer prevents the carbon-coated contact attached to the elastomer from making electrical contact with the carbon-coated contacts of the first and second copper traces when the user activated switches are unactivated.

21. The accessory of claim 19, wherein the electrical devices are one of field effect transistors and bipolar junction transistors.

22. The accessory of claim 19, wherein a processor monitors the plurality of user activated switches and provides the control signal to one of the plurality of electrical devices upon switch assertion.

23. The accessory of claim 19, wherein the plurality of electrical devices includes a first electrical device that causes a distinguishable electrical output to be provided on the single output line when a first control signal is asserted on a first control terminal of the first electrical device and a second electrical device that causes a different distinguishable electrical output to be provided on the single output line when a second control signal is asserted on a second control terminal of the second electrical device, and wherein the plurality of user activated switches includes a first user activated switch with carbon-coated contacts which when asserted provides the first control signal to the first control terminal of the first electrical device and a second user activated switch with carbon-coated contacts which when asserted provides the second control signal to the second control terminal of the second electrical device.

* * * * *